US007834965B2

(12) United States Patent
Kim et al.

(10) Patent No.: US 7,834,965 B2
(45) Date of Patent: *Nov. 16, 2010

(54) TFT ARRAY SUBSTRATE, METHOD FOR MANUFACTURING THE SAME, AND LIQUID CRYSTAL DISPLAY HAVING THE SAME

(75) Inventors: Jae-Hyun Kim, Suwon-si (KR); Won-Sang Park, Yongin-si (KR); Sang-Woo Kim, Suwon-si (KR); Jae-Young Lee, Seoul (KR); Sung-Eun Cha, Geojae-si (KR); Jae-Ik Lim, Chuncheon-si (KR)

(73) Assignee: Samsung Electronics, Co., Ltd., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/013,107

(22) Filed: Jan. 11, 2008

(65) Prior Publication Data

US 2008/0106663 A1 May 8, 2008

Related U.S. Application Data

(63) Continuation of application No. 11/049,722, filed on Feb. 4, 2005, now Pat. No. 7,330,231.

(30) Foreign Application Priority Data

Feb. 5, 2004 (KR) ................. 2004-07636

(51) Int. Cl.
*G02F 1/1335* (2006.01)
*G02F 1/136* (2006.01)

(52) U.S. Cl. ......................... 349/114; 349/42

(58) Field of Classification Search ................. 349/114, 349/42

See application file for complete search history.

(56) References Cited

U.S. PATENT DOCUMENTS

| 6,704,081 | B2 * | 3/2004 | Ha et al. ..................... 349/114 |
| 6,825,902 | B2 * | 11/2004 | Kaneko ....................... 349/114 |
| 6,831,709 | B2 * | 12/2004 | Yamada et al. ................ 349/44 |
| 6,853,421 | B2 * | 2/2005 | Sakamoto et al. ........... 349/114 |
| 6,894,745 | B2 * | 5/2005 | Fujimori et al. ............. 349/113 |
| 6,970,217 | B2 * | 11/2005 | Lim et al. .................... 349/114 |
| 7,053,974 | B2 * | 5/2006 | Hwang ........................ 349/155 |
| 7,126,662 | B2 * | 10/2006 | Choi et al. ................... 349/155 |
| 7,209,199 | B2 * | 4/2007 | Yang et al. ................... 349/114 |
| 7,330,231 | B2 * | 2/2008 | Kim et al. .................... 349/114 |
| 2004/0105056 | A1 * | 6/2004 | Iida et al. ..................... 349/113 |

(Continued)

FOREIGN PATENT DOCUMENTS

JP         2005031662  A    *    2/2005

(Continued)

*Primary Examiner*—Mike Qi
(74) *Attorney, Agent, or Firm*—F. Chau & Associates, LLC

(57) ABSTRACT

The present invention discloses a thin film transistor array substrate, a method for manufacturing the array substrate, and a liquid crystal display. The present invention further discloses a liquid crystal display having a reflective area and a transmissive area, which the image quality can be enhanced with. The present invention also discloses a liquid crystal display that has a liquid crystal layer whose thickness is depends on position.

25 Claims, 19 Drawing Sheets

U.S. PATENT DOCUMENTS

| | | | |
|---|---|---|---|
| 2004/0183967 A1* | 9/2004 | Kim et al. | 349/113 |
| 2004/0201802 A1* | 10/2004 | Ha et al. | 349/114 |
| 2004/0207784 A1* | 10/2004 | Lim et al. | 349/114 |
| 2005/0030454 A1* | 2/2005 | Jang et al. | 349/114 |

FOREIGN PATENT DOCUMENTS

| | | |
|---|---|---|
| KR | 100332519 | 4/2002 |
| KR | 1020030071114 | 9/2003 |

* cited by examiner

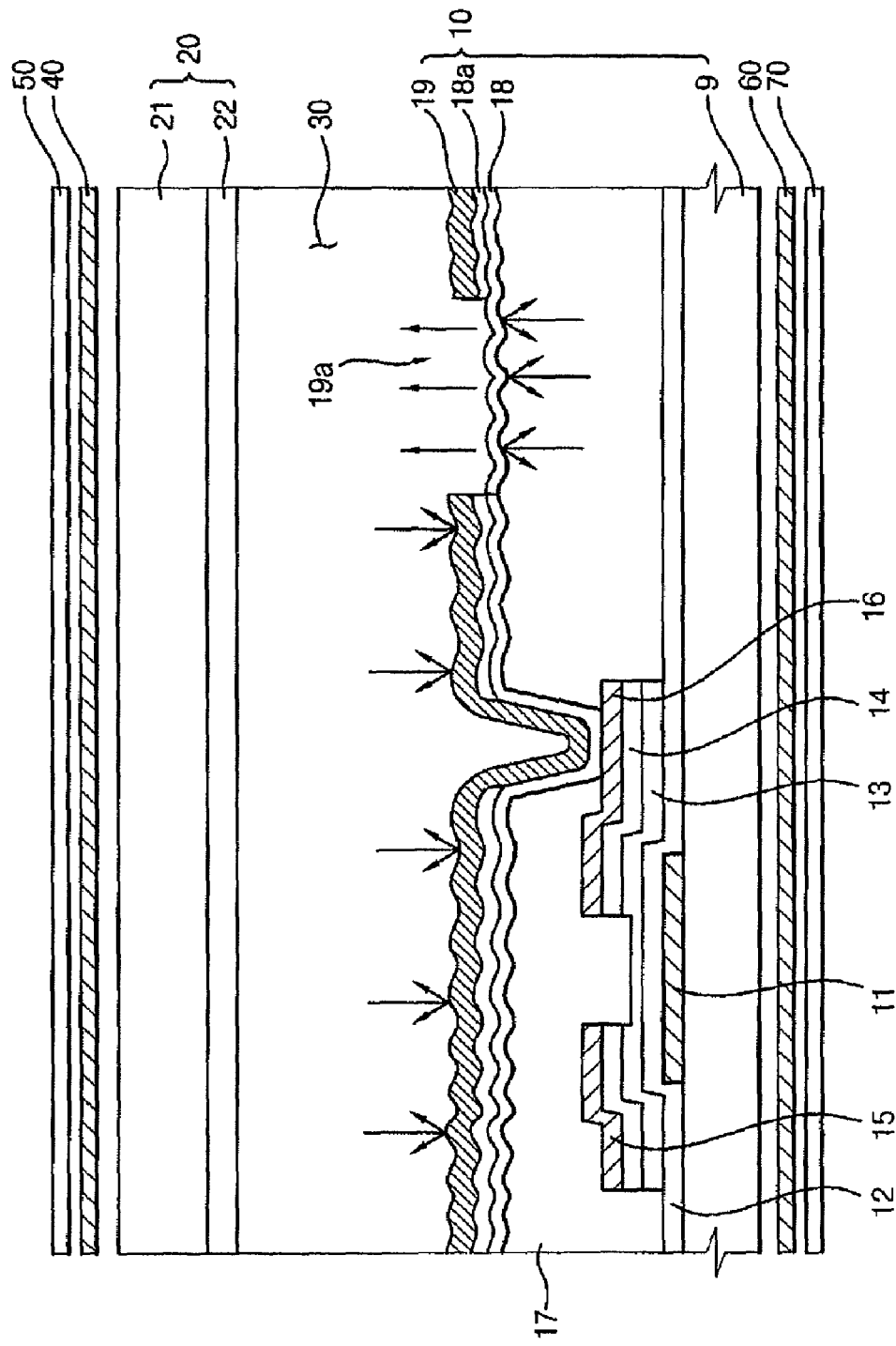

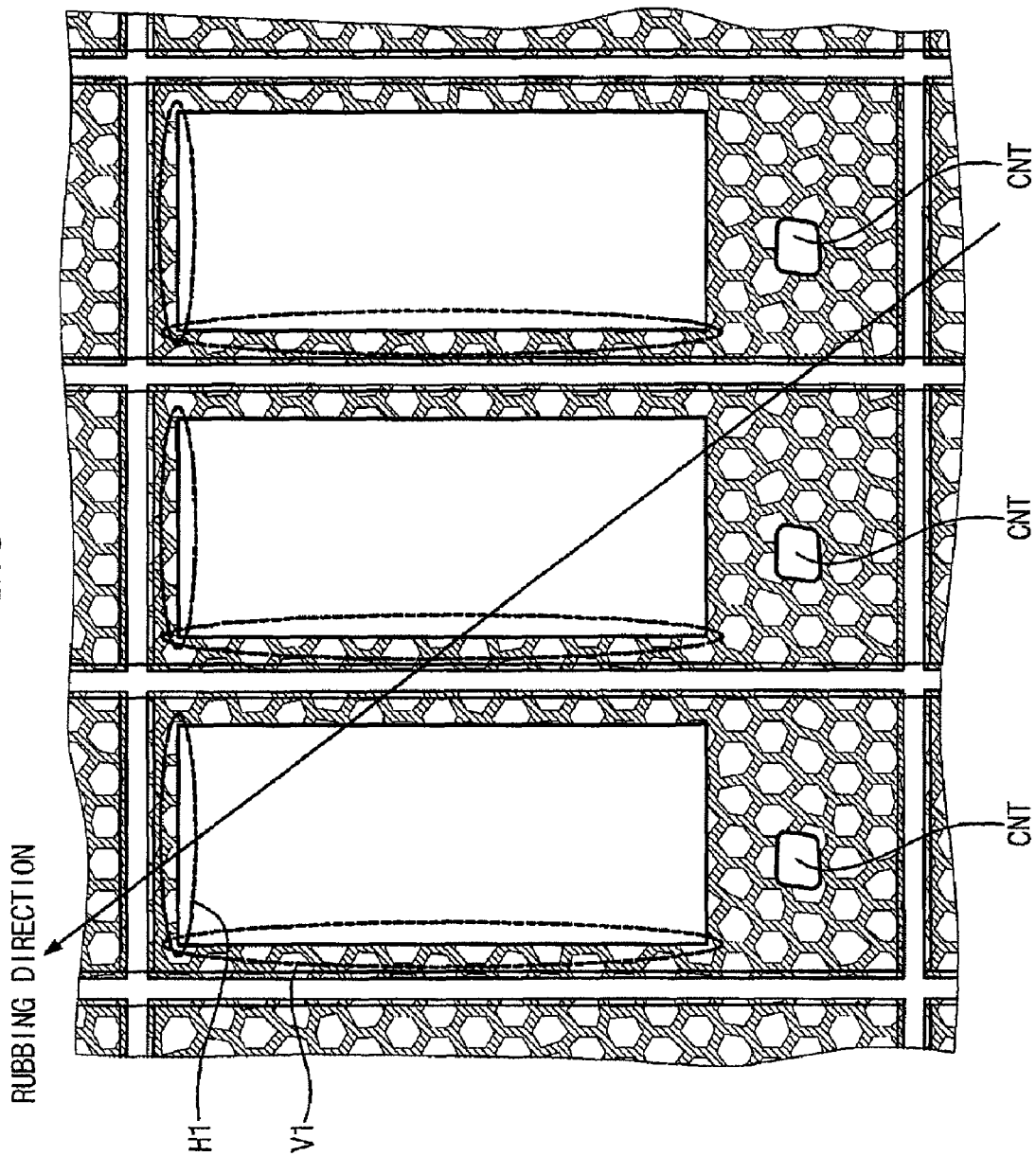

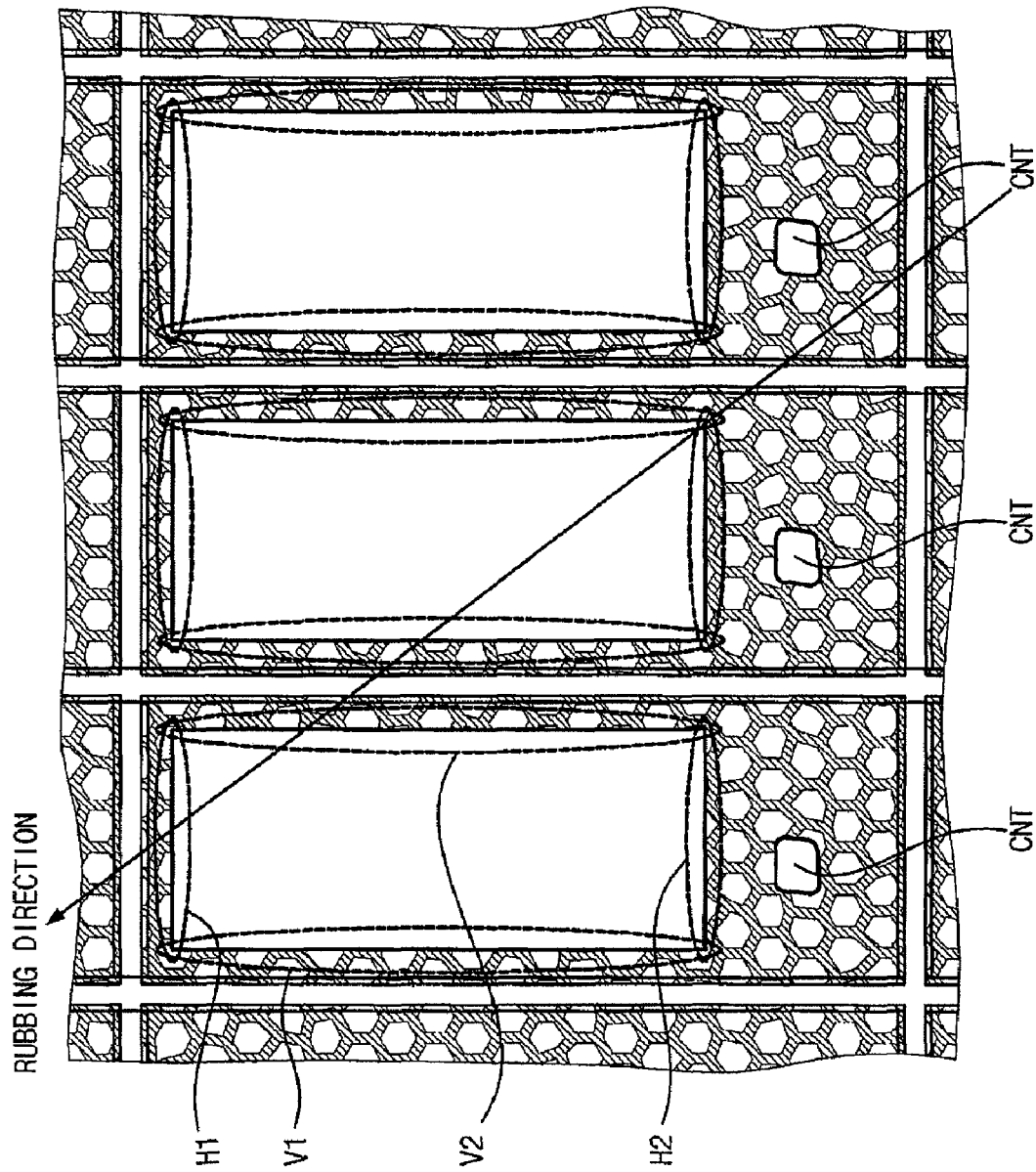

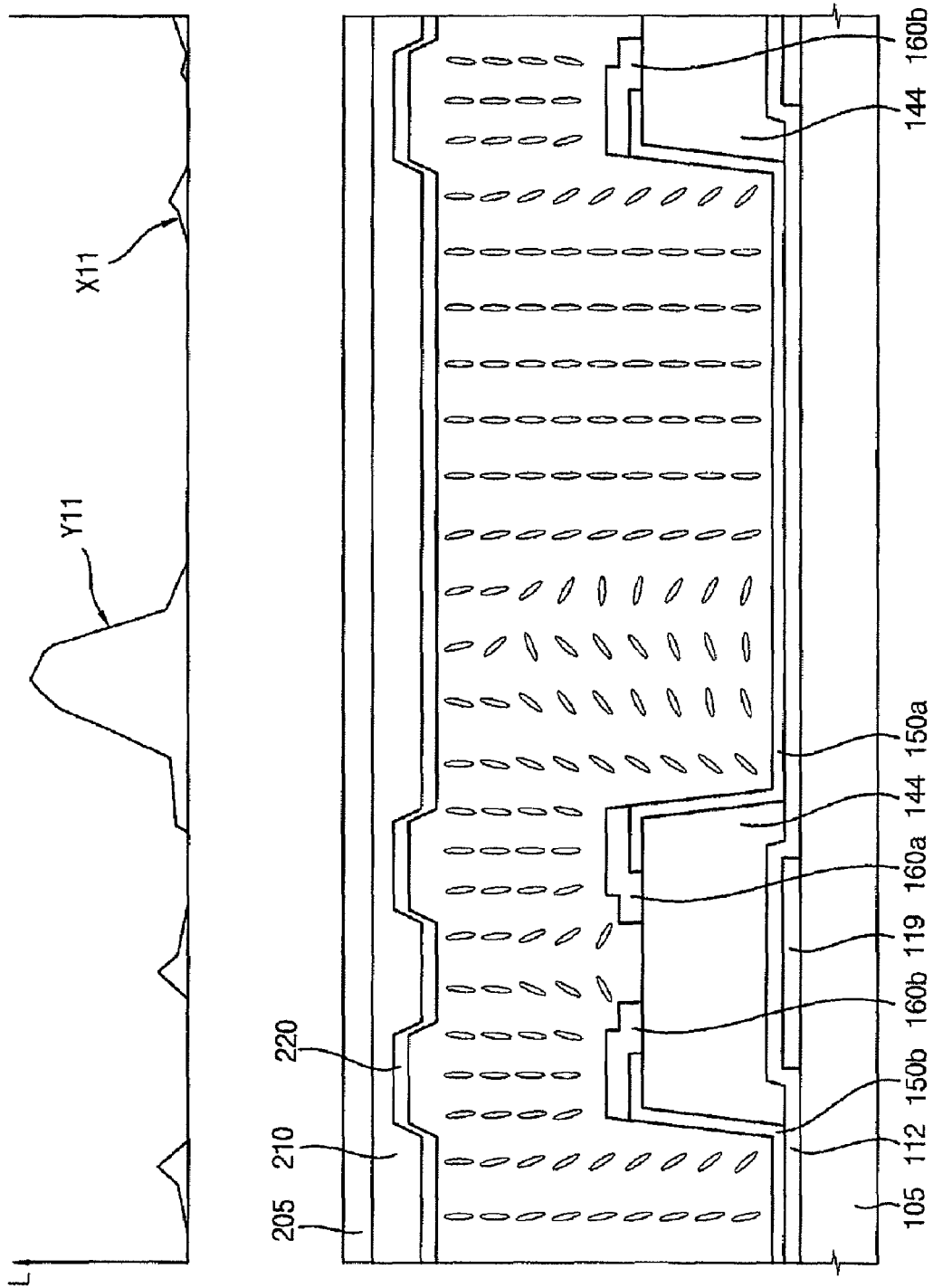

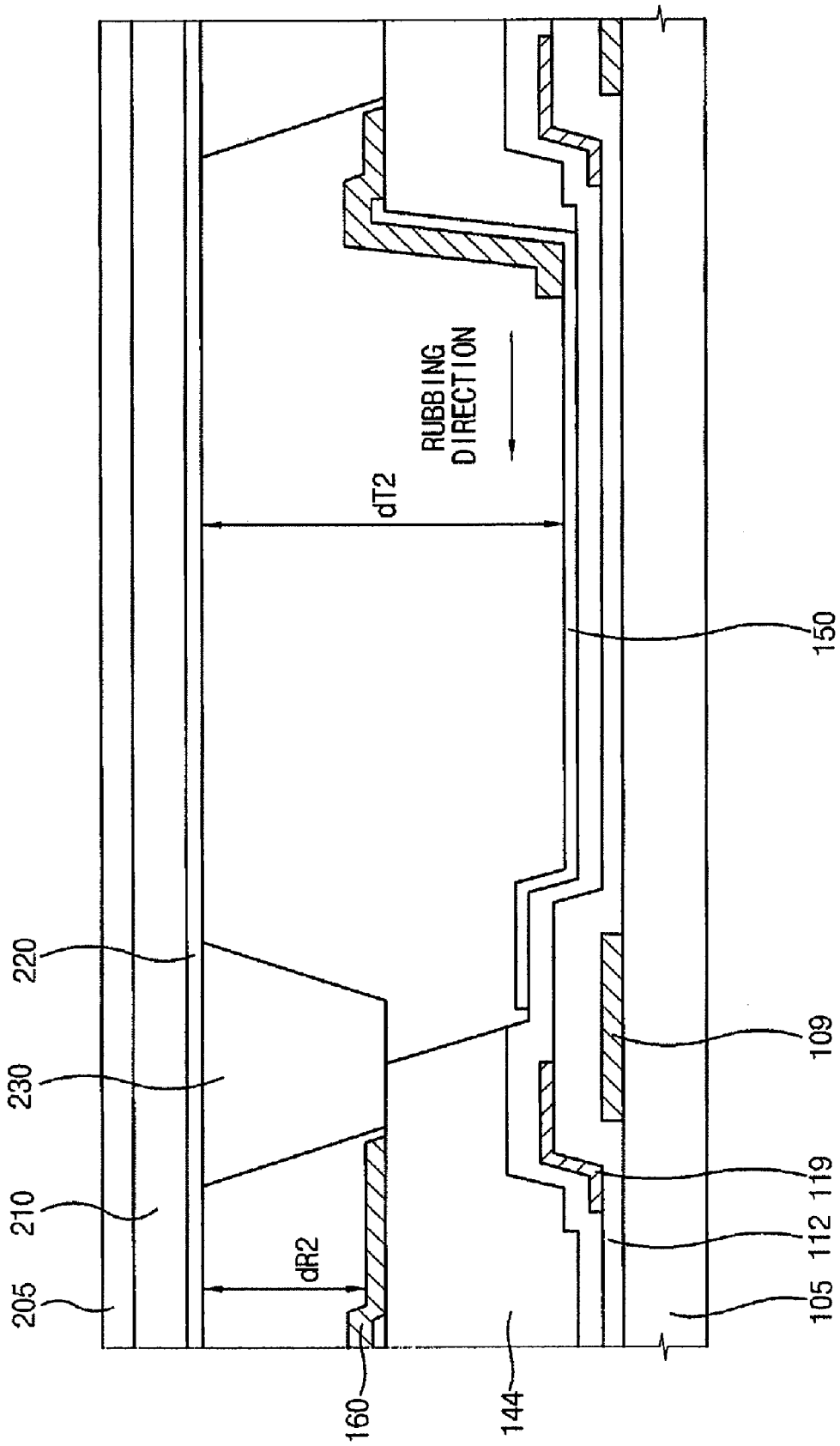

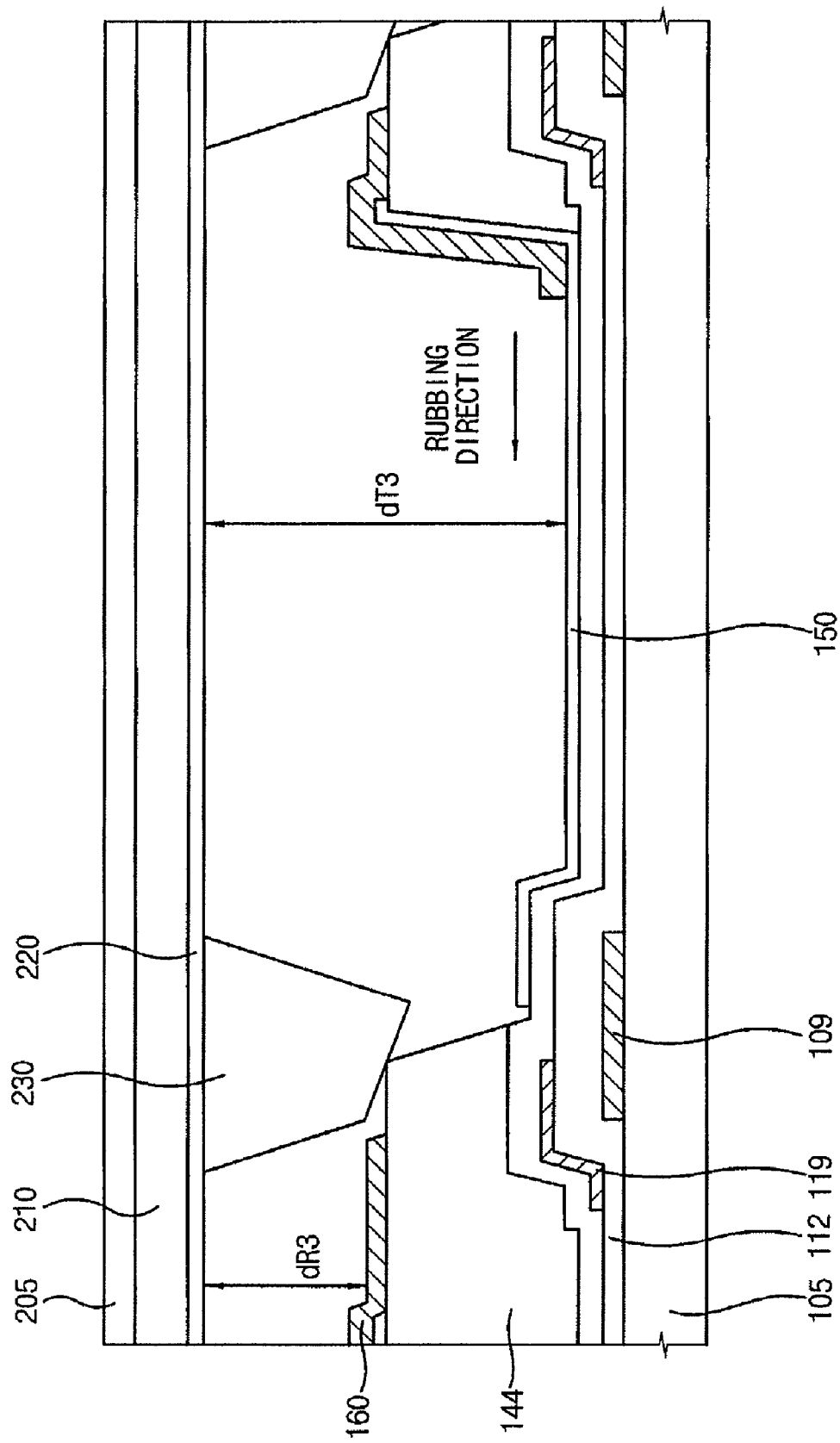

TFT ARRAY SUBSTRATE, METHOD FOR MANUFACTURING THE SAME, AND LIQUID CRYSTAL DISPLAY HAVING THE SAME

CROSS-REFERENCE TO RELATED APPLICATIONS

This application is a continuation of U.S. patent application Ser. No. 11/049,722, filed Feb. 4, 2005, now U.S. Pat. No. 7,330,231 which claims priority to Korean Patent Application No. 2004-7636, filed on Feb. 5, 2004, the disclosures of which are incorporated by reference herein in their entirety.

BACKGROUND OF THE INVENTION

1. Field of the Invention

The present invention relates to a thin film transistor (TFT) array substrate, a method for manufacturing the same and a liquid crystal display device having the TFT array substrate. More particularly, the present invention relates to a TFT array substrate forming a display and capable of enhancing the display quality, a method for manufacturing the same, and a liquid crystal display device having the TFT array substrate.

2. Description of the Related Art

Generally, a reflective type liquid crystal display device uses an ambient light to display an image. Therefore, in a dark place, the reflective type liquid crystal display device may not display an image clearly.

However, a transmissive type liquid crystal display device uses a light generated from a backlight assembly. Therefore, the transmissive type liquid crystal display device displays an image clearly regardless of ambient brightness. However, the transmissive type liquid crystal display consumes much energy to drive the backlight assembly. Therefore, the transmissive type liquid crystal display is inadequate for a portable display device.

A transmissive and reflective type liquid crystal display has the merits of the reflective type and transmissive type liquid crystal display.

FIG. 1 is a cross-sectional view of a conventional transmissive and reflective type liquid crystal display.

Referring to FIG. 1, a conventional transmissive and reflective type liquid crystal display includes a TFT array substrate 10, a color filter substrate 20, a liquid crystal layer 30, an upper quarter wave plate 40, an upper polarizer 50, a lower quarter wave plate 60 and a lower polarizer 70. The TFT array substrate 10 includes a reflective layer 19 having a reflective region and transmissive window 19a. The color filter substrate 20 faces the TFT array substrate 10. The liquid crystal layer 30 is interposed between the TFT array substrate 10 and the color filter substrate 20. The upper quarter wave plate 40 and the upper polarizer 50 are disposed over the color filter substrate 20 in sequence, and the lower quarter wave plate 60 and the lower polarizer 70 are disposed below the TFT array substrate 10 in sequence.

FIGS. 2A and 2B are schematic views showing an operational principle of the conventional transmissive and reflective type liquid crystal display of FIG. 1. FIG. 2A corresponds to a reflective mode operation, and FIG. 2B corresponds to a transmissive mode operation. Especially, the conventional transmissive and reflective type liquid crystal display corresponds to a normally white mode liquid crystal display that shows a white color, when no electric fields are applied to a liquid crystal layer.

Referring to FIG. 2A, during the reflective mode operation, an external light passes through the upper polarizer 50 to form a linearly polarized light. Then, the linearly polarized light passes through the upper quarter wave plate 40 to form a circularly polarized light. The circularly polarized light may be right-handed or left-handed.

The circularly polarized light passes through the liquid crystal layer 30. When electric field is not applied to the liquid crystal (LC) layer 30, the liquid crystal molecules are twisted. In this case, the phase of the circularly polarized light is changed by $\lambda/4$ to form a linearly polarized light after the light passes through the LC layer. The linearly polarized light is reflected on the reflective layer 19 and advances the liquid crystal layer 30 again. Then, the phase of the circularly polarized light is changed by $\lambda/4$ to form a circularly polarized light again. The circularly polarized light passes through the upper quarter wave plate 40 again to form a linearly polarized light. Then, the linearly polarized light passes through the upper polarizer 50 to display a white color.

However, when electric field is applied to the liquid crystal layer 30, the circularly polarized light coming from the upper quarter wave plate 40 passes through the liquid crystal layer 30 without phase changes, and the light is reflected on the reflective layer 19. After that, the light advances toward the upper quarter wave plate 40 again to pass through the upper quarter wave plate 40. Then, the phase is changed by $\lambda/4$ to form a linearly polarized light of which plane of vibration is perpendicular to the upper polarizer 50. The linearly polarized light does not pass through the upper polarizer 50 to display a black color.

Referring to FIG. 2B, during the transmissive mode operation, a light generated from a backlight assembly passes through the lower polarizer 70 to form a linearly polarized light. Then, the linearly polarized light passes through the lower quarter wave plate 60 to form a circularly polarized light. The circularly polarized light passes through the liquid crystal layer 30. When electric field is not applied to the liquid crystal (LC) layer 30, the liquid crystal molecules are twisted. In this case, the phase of the circularly polarized light is changed by $\lambda/4$ to form a linearly polarized light after the light passes through the LC layer. The linearly polarized light passes through the upper quarter wave plate 40 to form a circularly polarized light. Then, the circularly polarized light passes through the upper polarizer 50 to display a white color.

However, when electric fields are applied to the liquid crystal layer 30, the circularly polarized light come from the lower quarter wave plate 60 passes through the liquid crystal layer 30 via the transmissive electrode 18. Then, the circularly polarized light passes through the upper quarter wave plate 40 to form a linearly polarized light of which vibration plane is perpendicular to the upper polarizer 50. The linearly polarized light does not pass through the upper polarizer 50 to display a black color.

SUMMARY OF THE INVENTION

The present invention provides an array substrate capable of enhancing a display quality, a method of manufacturing the array substrate, and a liquid crystal display having the array substrate.

To realize abovementioned devices, a gate line is formed on a first glass substrate. The gate line may have a protrusion to make a gate electrode. A gate insulation layer is formed on the gate line. A semiconductor layer is formed on the gate line and on the gate insulation layer to form an active region. An ohmic contact layer is formed on the active region. A data line is formed on the gate insulation layer. The data line crosses the gate line. The data line may be formed on the ohmic contact layer. The data line may have a protrusion to make a source electrode. A drain electrode is formed on the ohmic contact layer. The gate electrode, the drain electrode, the source electrode, and the active region form a thin film transistor (TFT). A passivation layer is formed on the active region, on the source electrode, and on the drain electrode. A portion of the passivation layer on the drain electrode is removed to make a contact hole. A portion of the passivation layer in a pixel region is removed to form a transmissive pattern. A transparent electrode is formed in the pixel region. The transparent electrode is coupled to the drain electrode through the contact hole. A reflection layer is formed on the transparent electrode. The reflection layer may be formed between the electrode and the passivation layer. A light shielding pattern is formed on a second glass substrate. The light shielding pattern may be formed on the first glass substrate. A color filter pattern is formed on the second glass substrate. A common electrode is formed on the color filter pattern. A spacer is formed on the common electrode. The first glass substrate and the second glass substrate is attached each other. A liquid crystal (LC) layer is injected between the first substrate and the second substrate. The LC layer may have a twisted nematic (TN) mode alignment or an electrically compensated birefringence (ECB) mode alignment. The rubbing direction on the first substrate and on the second substrate of the ECB mode may be anti-parallel, so that the LC molecules are aligned parallel each other. A back light unit may be attached on the first substrate. A phase retardation optical film may be attached on the first substrate. Another phase retardation optical film may be attached on the second substrate. A pair of polarizers is attached on the outside of the assembly of the first substrate and the second substrate. The spacer opposes the region that the data line crosses the gate line. Sides of the transmissive window are substantially parallel with sides of the pixel area. The transmissive pattern may have substantially rectangular shape. The transmissive pattern may have a recession in a corner of the rectangular shape. The spacer may oppose the corner. The recession may be curved, linear or having a step shape. At lease one side of the transmissive pattern is overlapped with a opaque pattern like the light shielding pattern, the gate line, the data line, etc. The first substrate may have an alignment layer that is formed on the electrode layer or on the reflection layer. The alignment layer may be rubbed with a rubbing cloth. When one or two sides of the substantially rectangular transmissive pattern overlap opaque layers, the sides are outgoing sides of the rubbing. The outgoing sides of the rubbing are the sides that a rubbing cloth goes to the outside from the inside of the substantially rectangular transmissive pattern in the rubbing process. An incoming side of the rubbing is the sides that a rubbing cloth comes into the substantially rectangular transmissive pattern from the outsides in the rubbing process.

BRIEF DESCRIPTION OF THE DRAWINGS

FIG. 1 is a cross-sectional view showing a conventional transmissive and reflective type liquid crystal display.

FIGS. 5A and 5B are schematic plan views of a multiple cell gap transmissive and reflective type liquid crystal display, which shows a reason of an afterimage by light leakage.

FIG. 6 is a cross-sectional view taken along a line B-B' of FIG. 3, which shows an arrangement of liquid crystal molecules of 20 ms after a voltage is applied.

FIGS. 8A, 8B, and 8C are cross-sectional views showing first, second and third comparative examples of a multiple cell gap transmissive and reflective type liquid crystal display.

DESCRIPTION OF PREFERRED EMBODIMENTS

Hereinafter the preferred embodiments of the present invention will be described in detail with reference to the accompanied drawings.

Figure 2A:
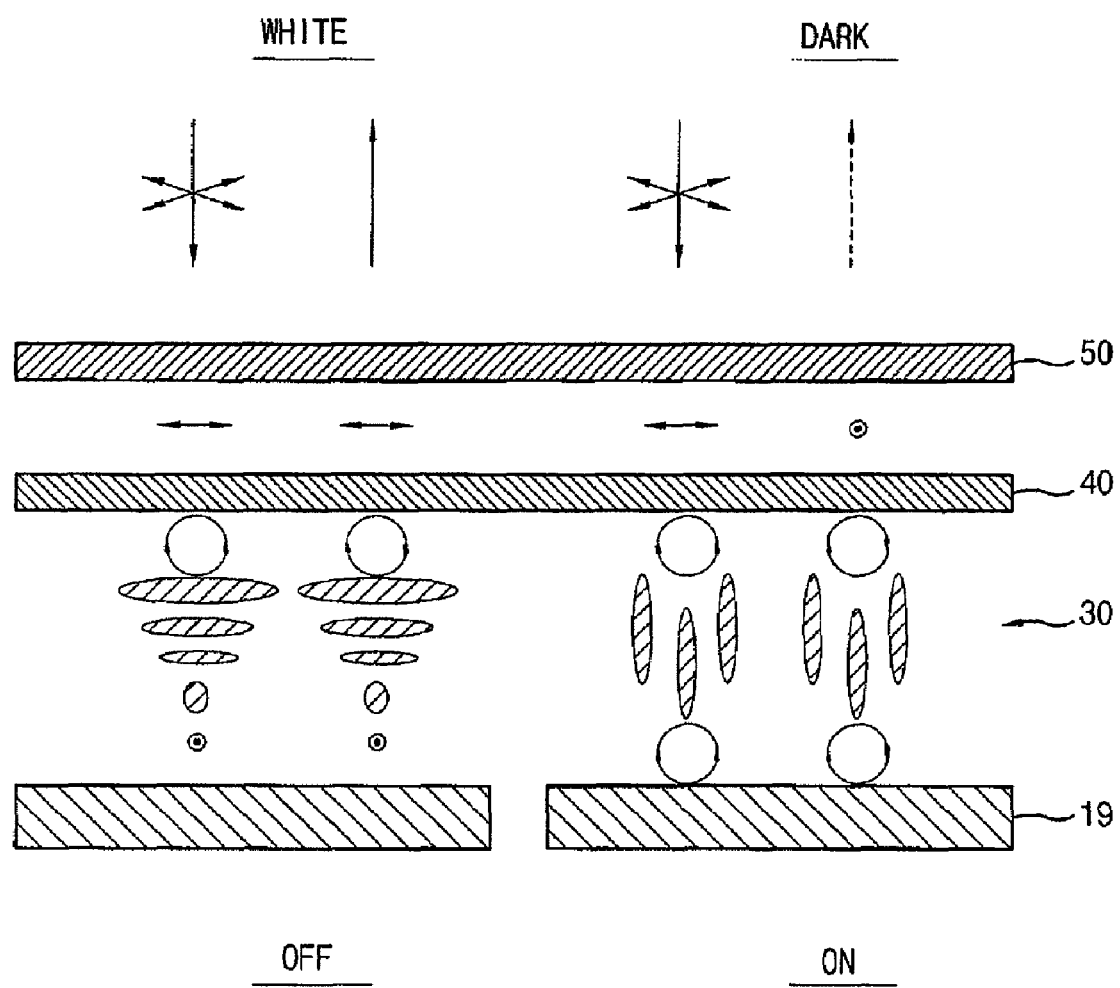
FIGS. 2A and 2B are schematic views showing an operational principle of the conventional transmissive and reflective type liquid crystal display of FIG. 1.
Figure 2B:
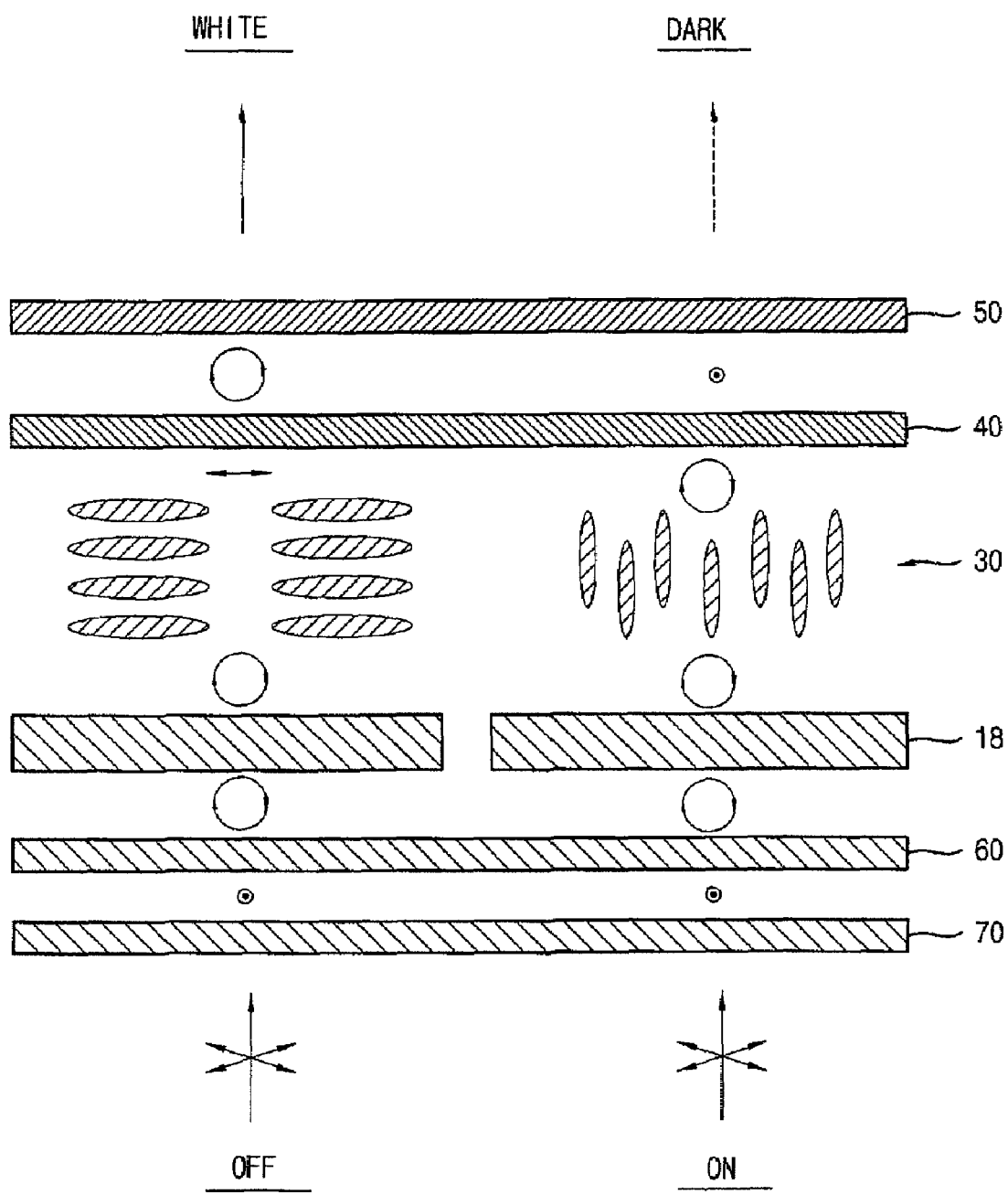
Figure 3:
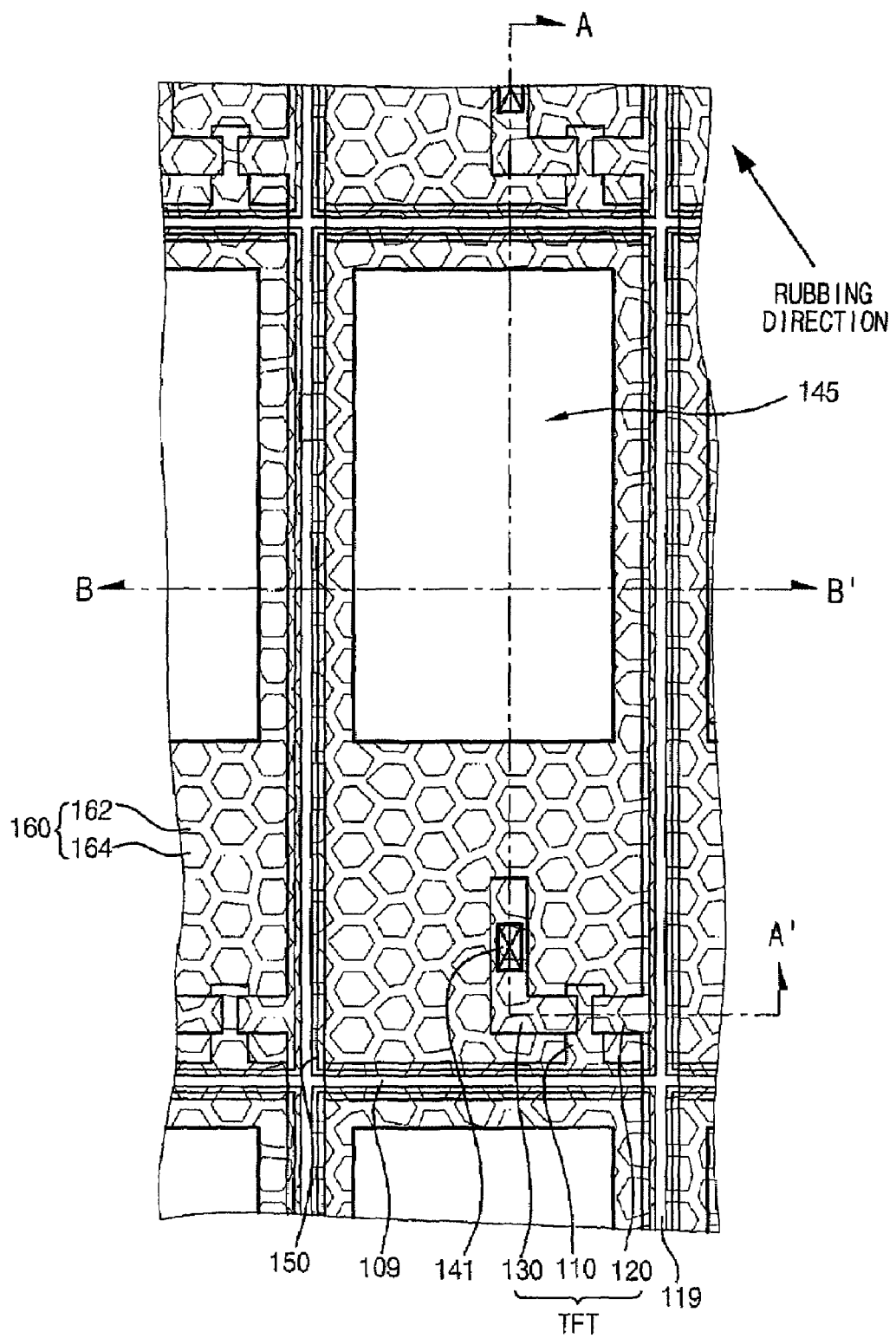
FIG. 3 is a plan view showing a multiple cell gap transmissive and reflective type liquid crystal display.

FIG. 3 displays a pixel of a TFT array substrate for a transmissive and reflective type liquid crystal display having top ITO structure.

Referring to FIG. 3, a TFT array substrate includes a switching device TFT, a transparent electrode 150 and a reflective layer 160. The switching device TFT is formed in a region that is defined by a gate line 109 extended in a horizontal direction, and a source line 119 extended in the vertical direction.

The switching device TFT includes a gate electrode 110 that is protruded from the gate line 109, a source electrode 120 that is protruded from the source line 119, and a drain electrode 130 that is spaced apart from the source electrode 120. The transparent electrode 150 is electrically connected to the drain electrode 130. The reflective layer 160 includes a reflective region that reflects an external light, and a transmissive region (or transmissive window) that transmits a light generated from a backlight assembly. The reflective layer 160 includes a plurality of recess and grooves.

Figure 4:
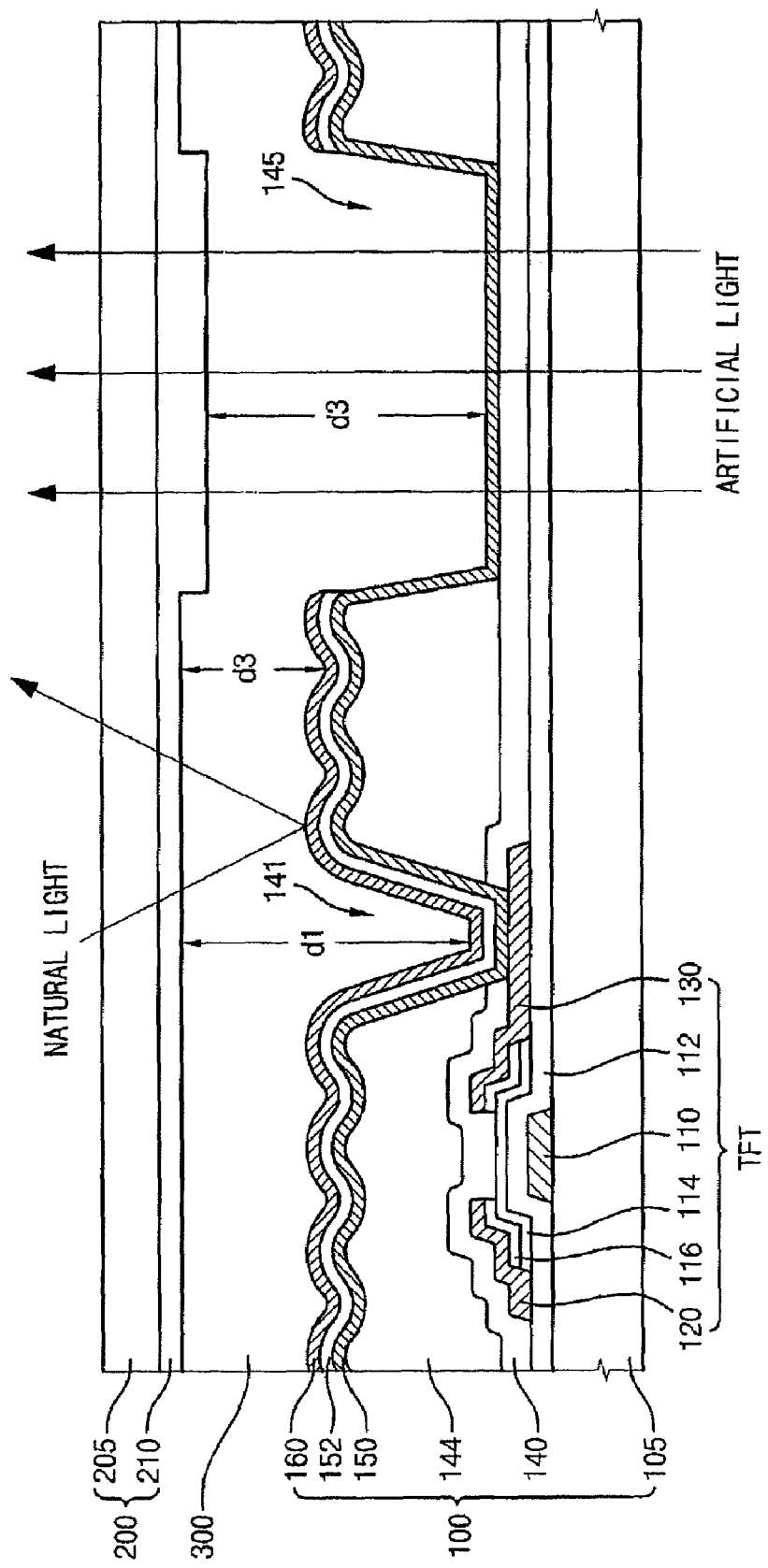
FIG. 4 is a cross-sectional view taken along a line A-A' of FIG. 3.

Referring to FIG. 4, a transmissive and reflective type liquid crystal display includes a TFT array substrate 100, a color filter substrate 200 and a liquid crystal layer 300 interposed between the TFT array substrate 100 and the color filter substrate 200.

The TFT array substrate 100 includes a first transparent substrate 105, a gate electrode 110, a gate insulation layer 112, a semiconductor layer 114, an ohmic contact layer 116, a drain electrode 130, a source electrode 120 and an organic insulation layer 140. A switching TFT comprises the gate electrode 110, the source electrode 120, the drain electrode 130, the semiconductor layer 114 and the ohmic contact layer 116. The gate electrode 110 is formed on the transparent substrate 105. The gate insulation layer 112 is formed on the transparent substrate 105, such that the gate insulation layer 112 covers the gate electrode 110. The organic insulation layer 140 includes a plurality of recesses and grooves to enhance a reflectivity.

The TFT array substrate 100 further includes a transparent electrode 150, a protection layer 152 and a reflective layer 160. A portion of the organic insulation layer 140 is opened to form a first contact hole 141. The transparent electrode 150 is electrically connected to the drain electrode 130 via the first contact hole 141. The protection layer 152 is formed on the transparent electrode 150, and the reflective layer 160 is formed on the protection layer 152. Hereinafter, a region where the reflective layer 160 is formed is referred to as a reflective region, and a region where the reflective layer 160 is not formed is referred to as a transmissive window (or transmissive region) 145.

The transparent electrode 150 comprises an optically transparent and electrically conductive material, for example, such as indium tin oxide (ITO), indium zinc oxide (IZO), etc. The TFT array substrate 100 may further includes a capacitor wiring (not shown) that is spaced apart from the switching device TFT, and the capacitor wiring is disposed, such that the capacitor wiring overlaps with the transparent electrode to form a storage capacitor Cst.

The color filter substrate 200 includes a second transparent substrate 205, a black matrix layer (not shown), a color filter 210, and a surface protection layer (not shown). The black matrix (not shown) defines R.G.B pixel regions. The surface protection layer (not shown) protects the black matrix (not shown) and the color filter 210. Instead of forming the black matrix, neighboring color filters may overlap to operate as the black matrix. A common electrode (not shown) may be formed on the surface protection layer.

The liquid crystal layer 300 is interposed between the TFT array substrate 100 and the color filter substrate 200, such that the liquid crystal layer 300 has different thickness in accordance with a region. The liquid crystal layer 300 transmits an ambient light or a light generated from a backlight assembly in accordance with a voltage applied to the transparent electrode 150 and the common electrode.

FIGS. 5A and 5B are schematic plan views of a multiple cell gap transmissive and reflective type liquid crystal display, which shows a reason of an afterimage by light leakage. In FIGS. 5A and 5B, 'CNT' represents a contact hole formed on a drain electrode of a switching device.

Referring to FIG. 5A, when an alignment film is rubbed in a 10 o'clock direction, an afterimage caused by light leakage is shown at a region of H1 and V1 which are outgoing sides of rubbing from the transmissive window.

Referring to FIG. 5B, when an alignment film is rubbed in a 10 o'clock direction, a light leakage is shown at a region of H1, H2, V1 and V2, which are a boundary of transmissive window.

As shown in FIG. 6, when a voltage is applied, liquid crystal molecules of a reflective region and a center portion of a transmissive window are vertically aligned within 20 ms. However, liquid crystal molecules of the right edge and the left edge of the transmissive window are not vertically aligned, so that light leaks as indicated by X11 and Y11. X11 is much smaller than Y11. Therefore covering Y11 with an opaque pattern may enough to improve the image quality. You may need to cover X11 also with an opaque pattern to improve the image quality.

Figure 7:
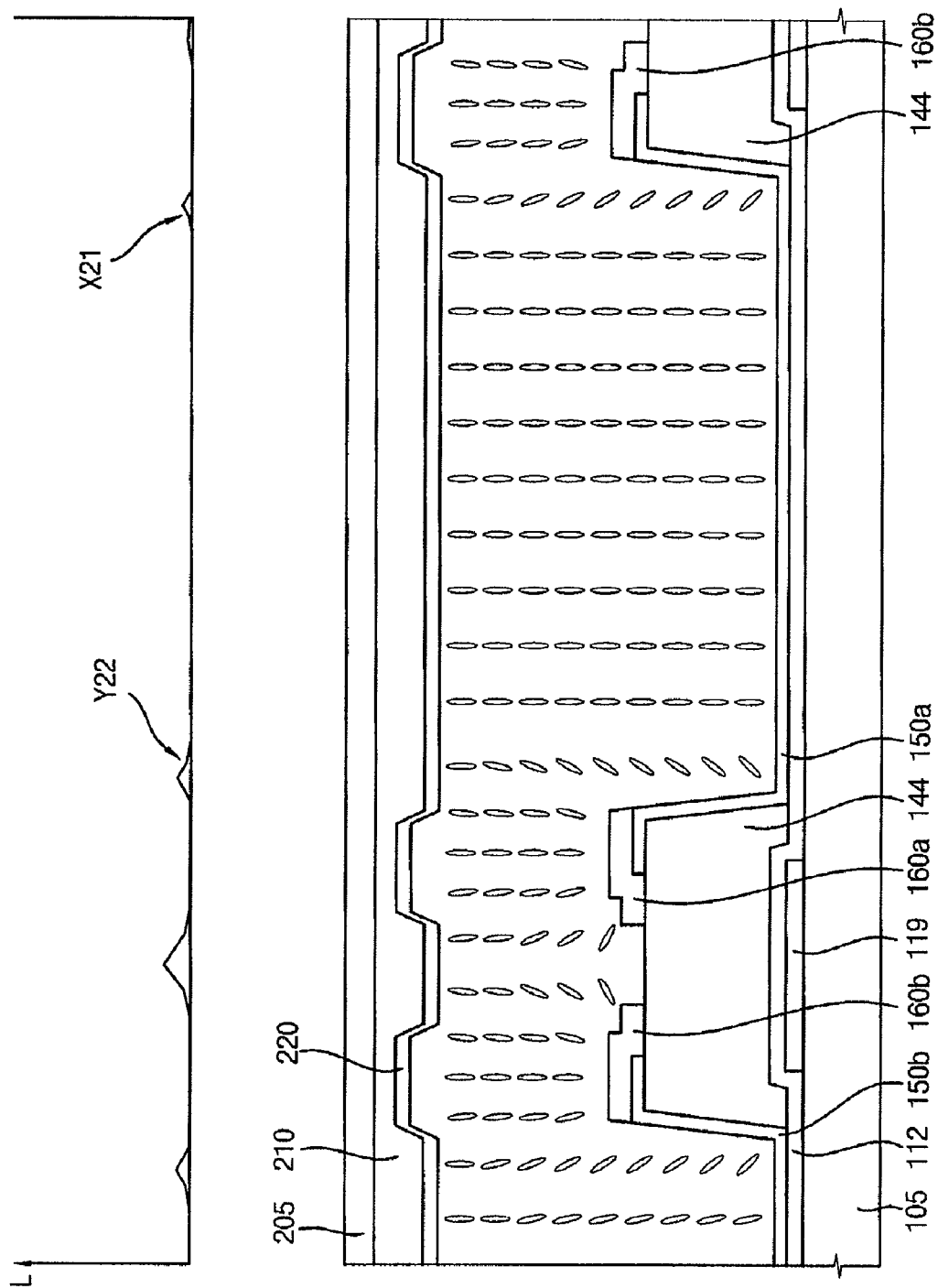
FIG. 7 is a cross-sectional view taken along a line B-B' of FIG. 3, which shows an arrangement of liquid crystal molecules of 200 ms after a voltage is applied.

In 200 ms after the voltage is applied the light leakage Y22 and X21 is smaller than X11 as shown in FIG. 7 but that may still degrade the image quality.

That is, an afterimage is remained at an early stage of a present frame due to a previous frame. Further, a light leakage happens successively at a next frame.

To remove the afterimage by light leakage, the transmissive window is formed on an end of the pixel area to shield some of the window edges are covered by an opaque pattern such as the gate line, the data line, the light shielding pattern, etc.

Figure 8A:
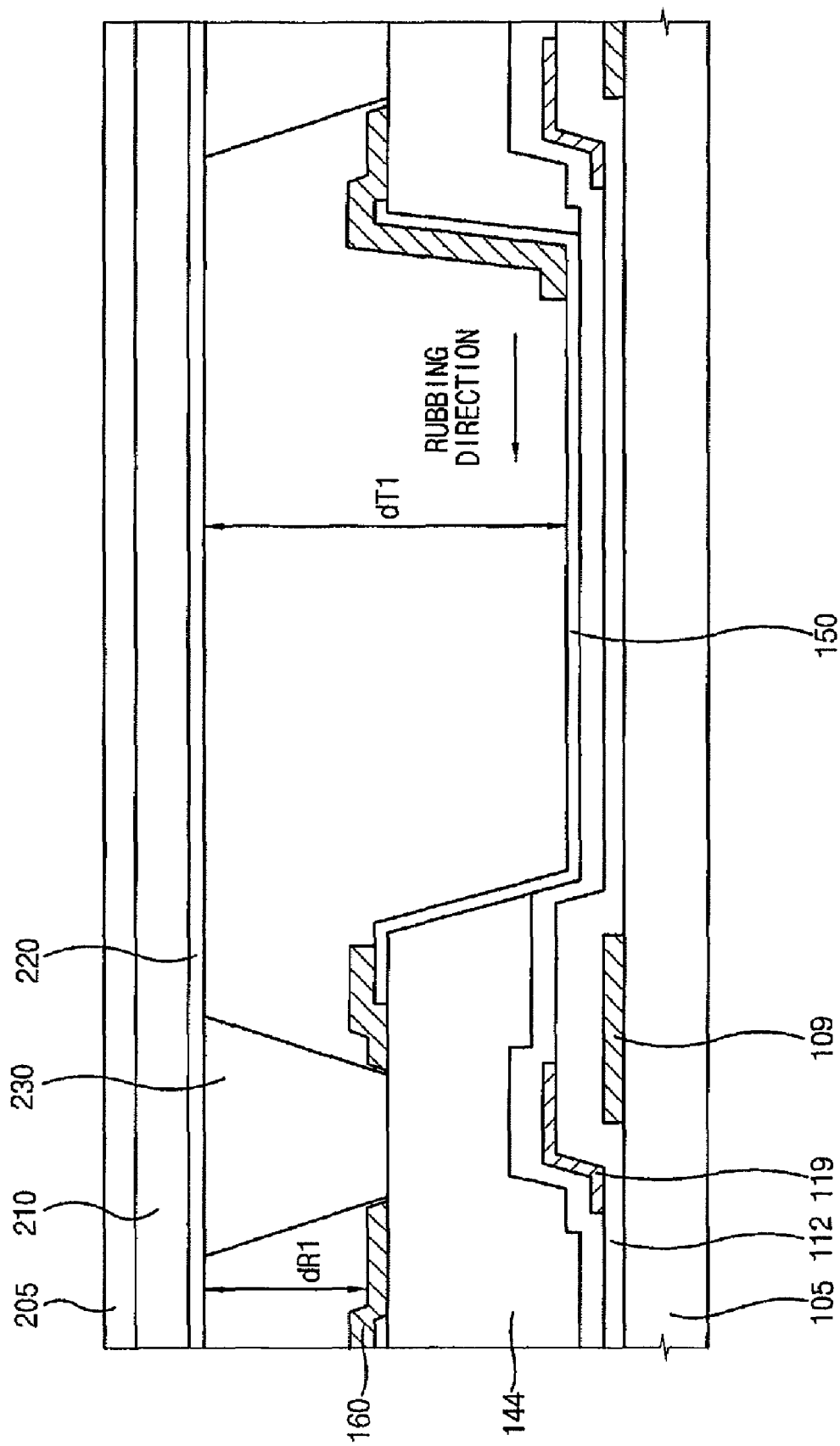

FIG. 8A shows an example of a multi cell gap structure. The spacer 230 on a color filter substrate opposes to an organic insulation layer 144 that is flat. FIGS. 8B and 8C show examples of a multi cell gap structure. The spacers oppose to a boundary of the transmissive window and the reflective region. FIG. 8A is an easier example than FIGS. 8B and 8C to control the cell gap because the opposing surface of spacer to the organic insulation layer does not change by variation of alignment between the CF substrate and the TFT substrate.

Figure 9:
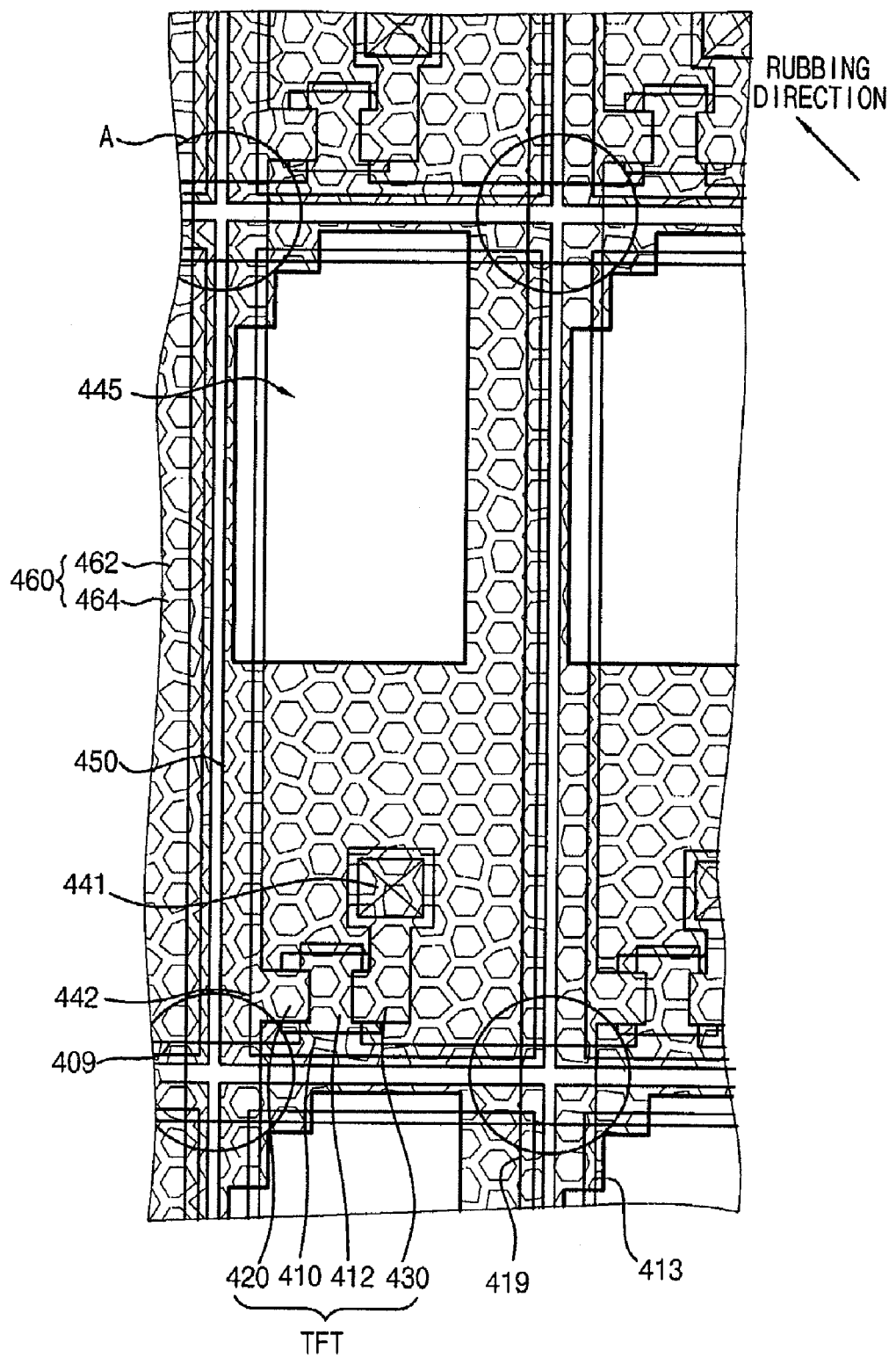
FIG. 9 is a plan view showing a multiple cell gap transmissive and reflective type liquid crystal display according to an exemplary embodiment of the present invention.

Referring to FIG. 9, a TFT array substrate according to an exemplary embodiment of the present invention includes gate lines 409, source lines 419, a switching device TFT, a transparent electrode 450 and a reflective layer 445 having a reflective region and a transmissive window 460.

The gate lines 409 formed on a substrate are extended in a horizontal direction, and arranged in a vertical direction. The source lines 419 are extended in the vertical direction and arranged in the horizontal direction.

The switching device TFT is formed in a region defined by neighboring gate lines 409 and neighboring source lines 419. The switching device TFT includes a gate electrode 410, a source electrode 420 and a drain electrode 430. The gate electrode 410 is protruded from the gate line 409, and the source electrode 420 is protruded from the source line 419. The drain electrode 430 is spaced apart from the source electrode 420.

The transparent electrode 450 is formed in the region defined by neighboring gate lines 409 and neighboring source lines 419. The transparent electrode 450 is electrically connected to the drain electrode 430 via a contact hole 441.

The reflective layer 460 is formed on the transparent electrode 450, and the reflective layer 460 includes a reflective region for reflecting an ambient light. A transmissive window 445 for transmitting a light generated from a backlight assembly is formed in a pixel region. A portion of the reflective layer 460 is protruded toward the transmissive window 445. The reflective layer is electrically coupled to the transparent electrode 450.

The transmissive window 445 has a polygonal shape not a rectangular shape. The sides of the transmissive window 445 may be substantially parallel with sides of the pixel region. The reflective region may extend toward an edge of the transmissive window. The transmissive window may be recessed in a corner of it.

Therefore, the spacer is disposed on a region 'A', so that the spacer is fully supported by the other substrate to control the cell gap easily.

The reflective layer 460 defines a reflective region. The reflective layer 460 is extended toward the transmissive window 445 so that the transmissive window may have a recession. The position of the recession may depend on the rubbing direction. For example, when the rubbing direction corresponds to a ten o'clock direction, an edge of the reflective region, which neighbors lower and right sides of the transmissive window 445, is extended toward the transmissive window 445 from the ten o'clock direction.

Now shown in FIG. 9, when a TFT array substrate employs a separate wiring method, a lower metal that is formed simultaneously with the gate lines 409 and an upper metal that is formed simultaneously with the source lines 419 form a storage capacitor Cst. The storage capacitor Cst is electrically connected to the transparent electrode 150 via a contact hole, so that the storage capacitor Cst is charged by electric charges provided from the drain electrode. The storage capacitor Cst is discharged to maintain a voltage, so that a displayed image is maintained.

Figure 10A:
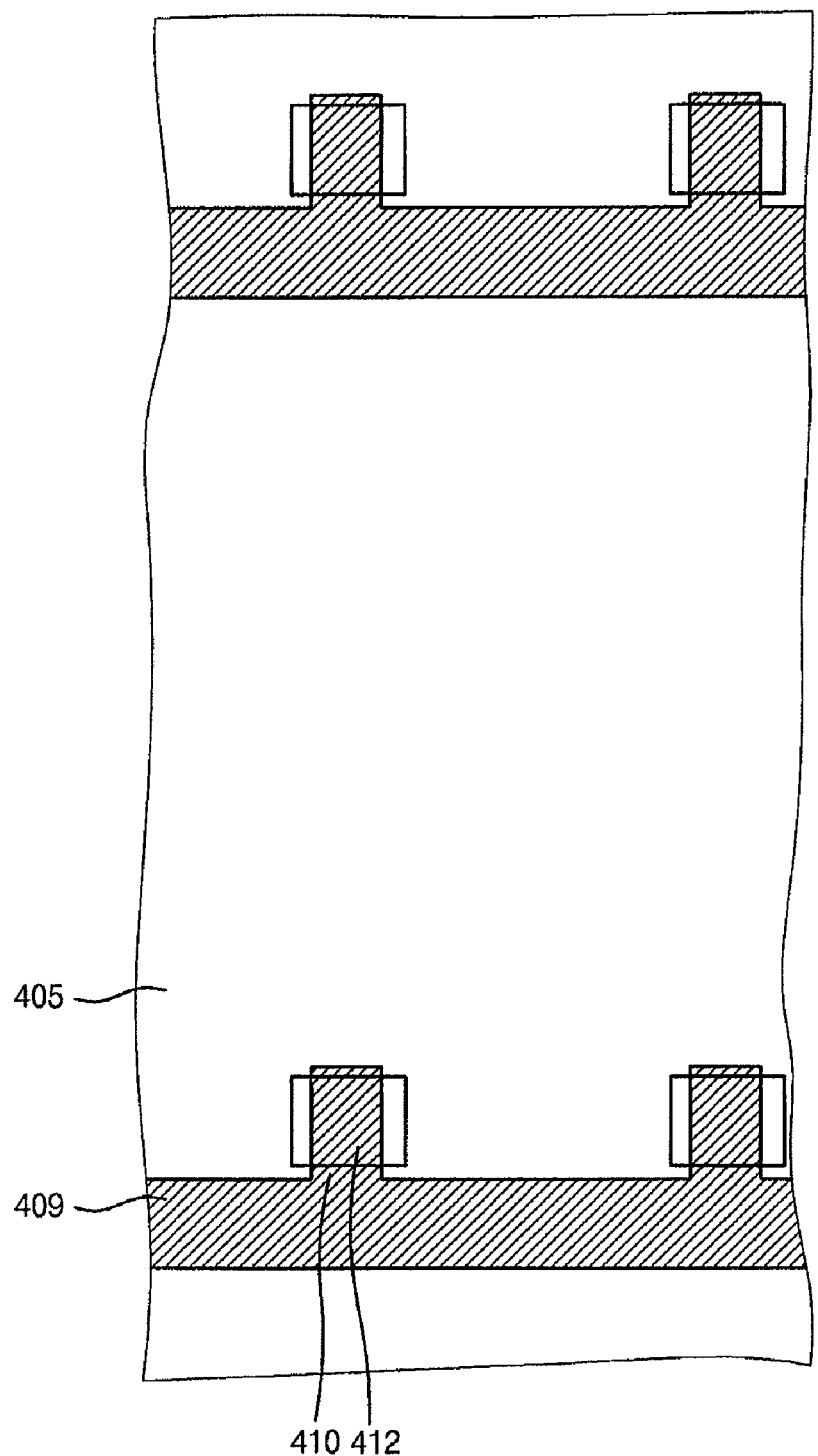
FIGS. 10A, 10B, 10C, 10D, and 10E are plan views showing a process for manufacturing a TFT array substrate of FIG. 9.

Hereinafter a method for manufacturing a TFT array substrate will be described. Referring to FIG. 10A, a metal layer is formed on a substrate 405. The metal layer comprises at least one from the group consisting of tantalum (Ta), titanium (Ti), molybdenum (Mo), aluminum (Al), chromium (Cr), cupper (Cu), and tungsten (W). The substrate 405 may be made of glass or ceramic. Then, the metal layer is patterned to form gate lines 409 and a gate electrode 410 protruded from the gate lines 409. The gate lines 409 are extended in a horizontal direction, and arranged in a vertical direction. A storage line (not shown) may further be formed in a process of forming the gate lines 409.

Successively, silicon nitride layer is formed on the substrate 405 and on the gate electrode 410 to form a gate insulation layer. For example, the silicon nitride layer may be formed via chemical vapor deposition (CVD) method. An amorphous silicon layer and n+ amorphous silicon layer is formed on the gate insulation layer, and patterned to form a semiconductor layer and an ohmic contact layer, which may define an active layer 412.

Figure 10B:
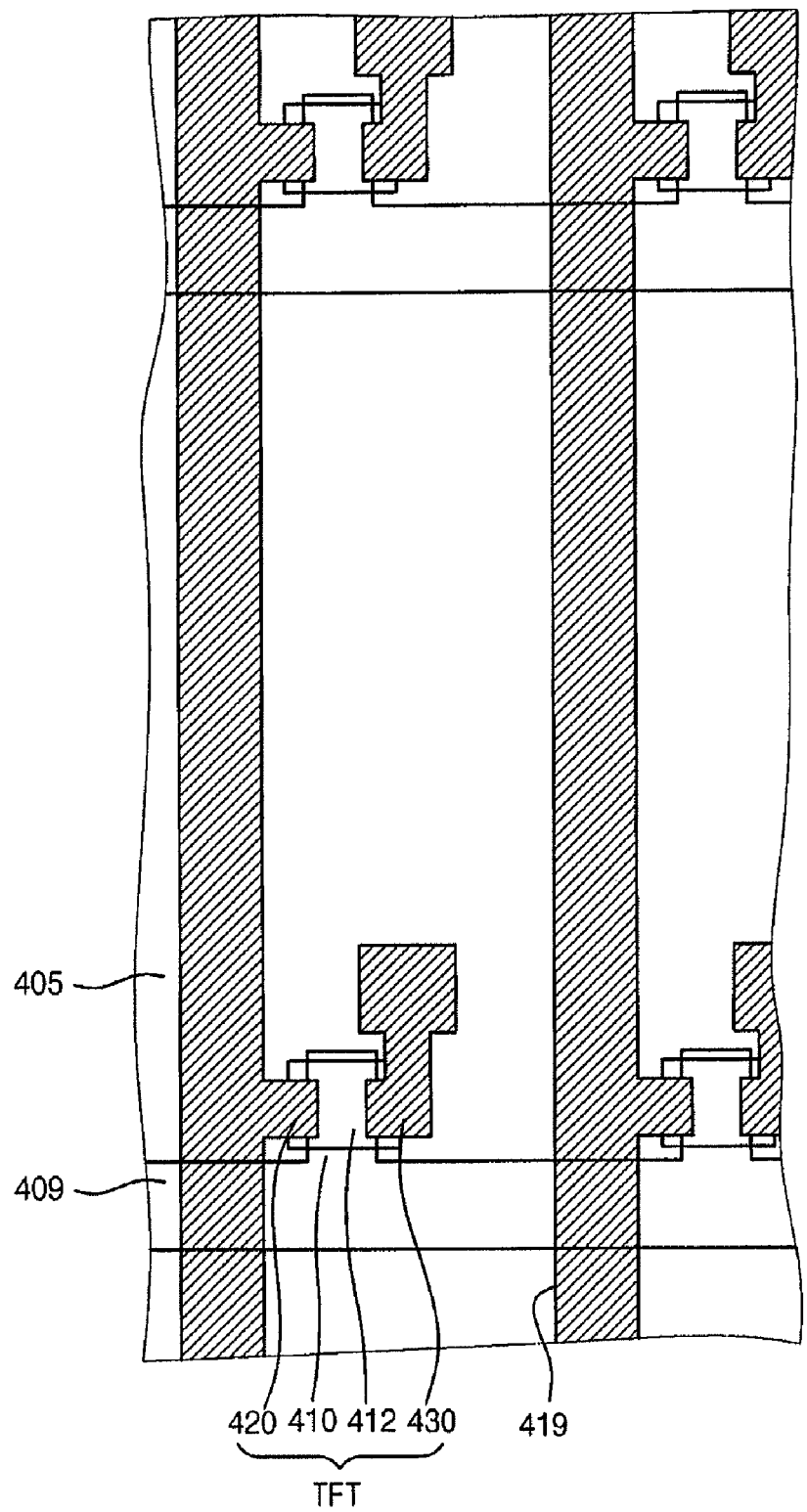

Referring to FIG. 10B, a metal layer is formed on the ohmic contact layer and on the gate insulation layer. The metal layer comprises at least one from the group consisting of tantalum (Ta), titanium (Ti), molybdenum (Mo), aluminum (Al), chromium (Cr), cupper (Cu), and tungsten (W). The metal layer is patterned to form source lines 419, a source electrode 420 protruded from the source lines 419, and a drain electrode that is spaced apart from the source electrode 420. The gate electrode 410, the active layer 412, the source electrode 420 and the drain electrode 430 form a thin film transistor.

Figure 10C:
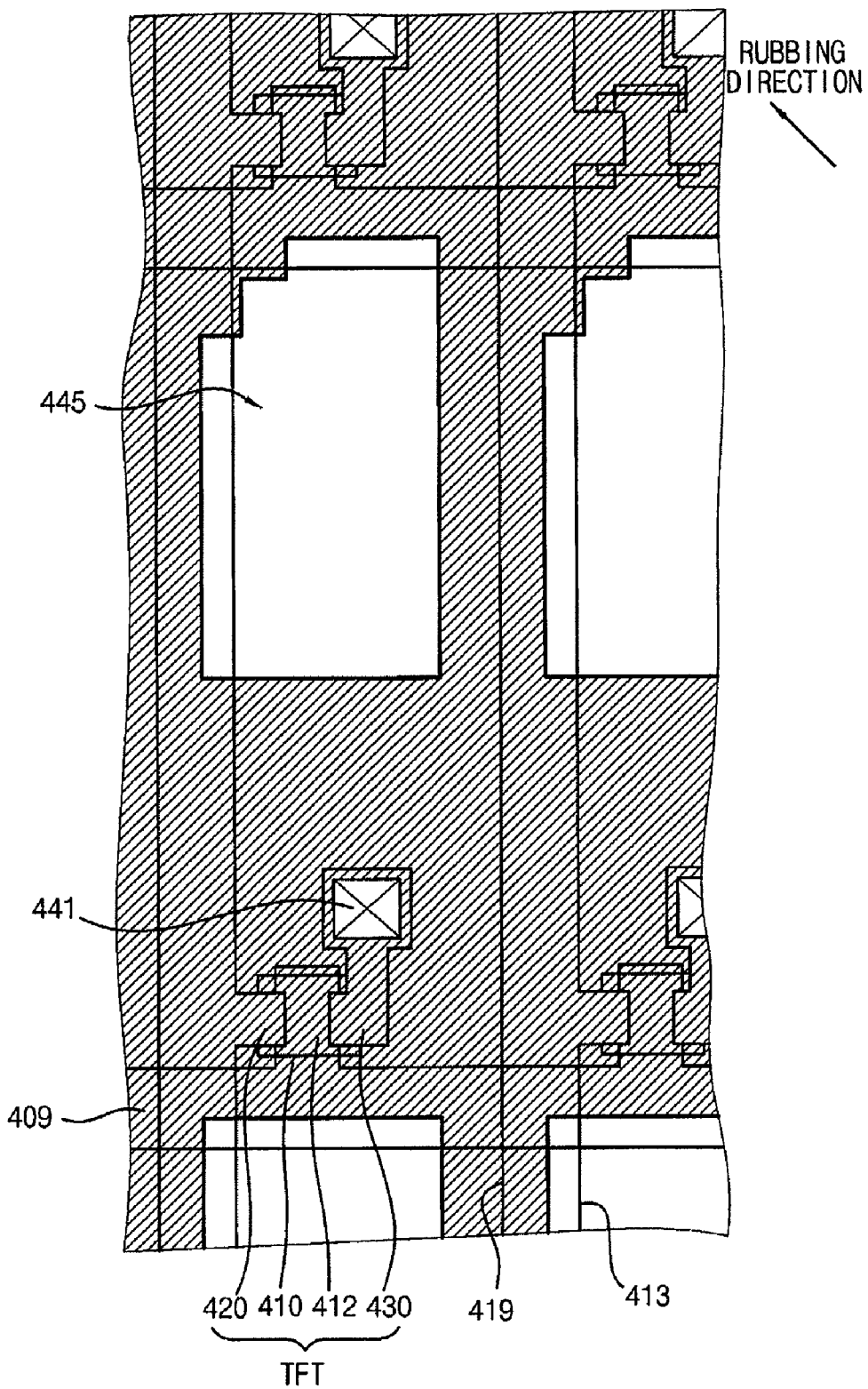

Referring to FIG. 10C, an organic insulation layer 440 is formed on the result of FIG. 10B. The organic insulation layer may be formed by a spin coating method. A portion of the organic insulation layer 440 is removed to form a transmissive window 445 and a contact hole 441.

A portion of the organic insulation layer may be removed to make a transmissive window pattern 445, such that a portion of the data lines 419 and a portion of the gate lines 409 overlap the transmissive window pattern. A corner of the transmissive window 445 is recessed. Therefore, a spacer may be supported fully by the organic insulation layer 440. A surface of the organic insulation layer 440 may undergo an embossing process in order to enhance reflection quality of a reflective layer that is to be formed on the organic insulation layer 440. Preferably, the embossing patterns have substantially same depth.

In FIG. 10C, a boundary of the left upper side of the transmissive window 445 is recessed because the rubbing direction is ten o'clock. In case that a rubbing direction corresponds to a two o'clock direction, the right upper side boundary of the transmissive window 445 will be recessed.

Figure 10D:
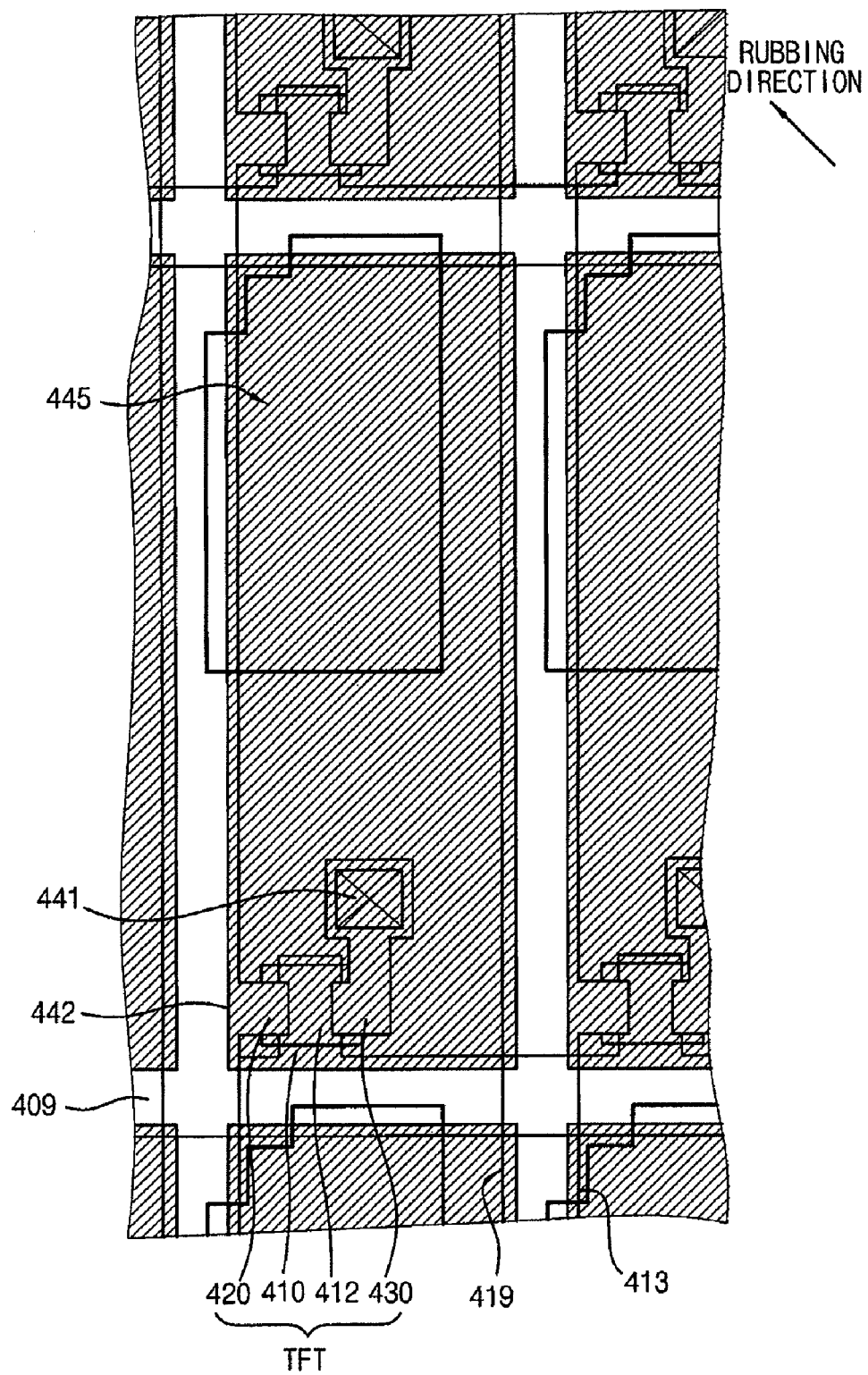

Referring to FIG. 10D, an indium tin oxide (ITO) layer 442 is formed and patterned to form a transparent electrode. The transparent electrode is electrically connected to the drain electrode 430 via the connection hole 441. The indium tin oxide layer 442 may be deposited entirely and patterned to remain only at a pixel region, and the indium tin oxide layer 442 may be deposited only on the pixel region.

Figure 10E:
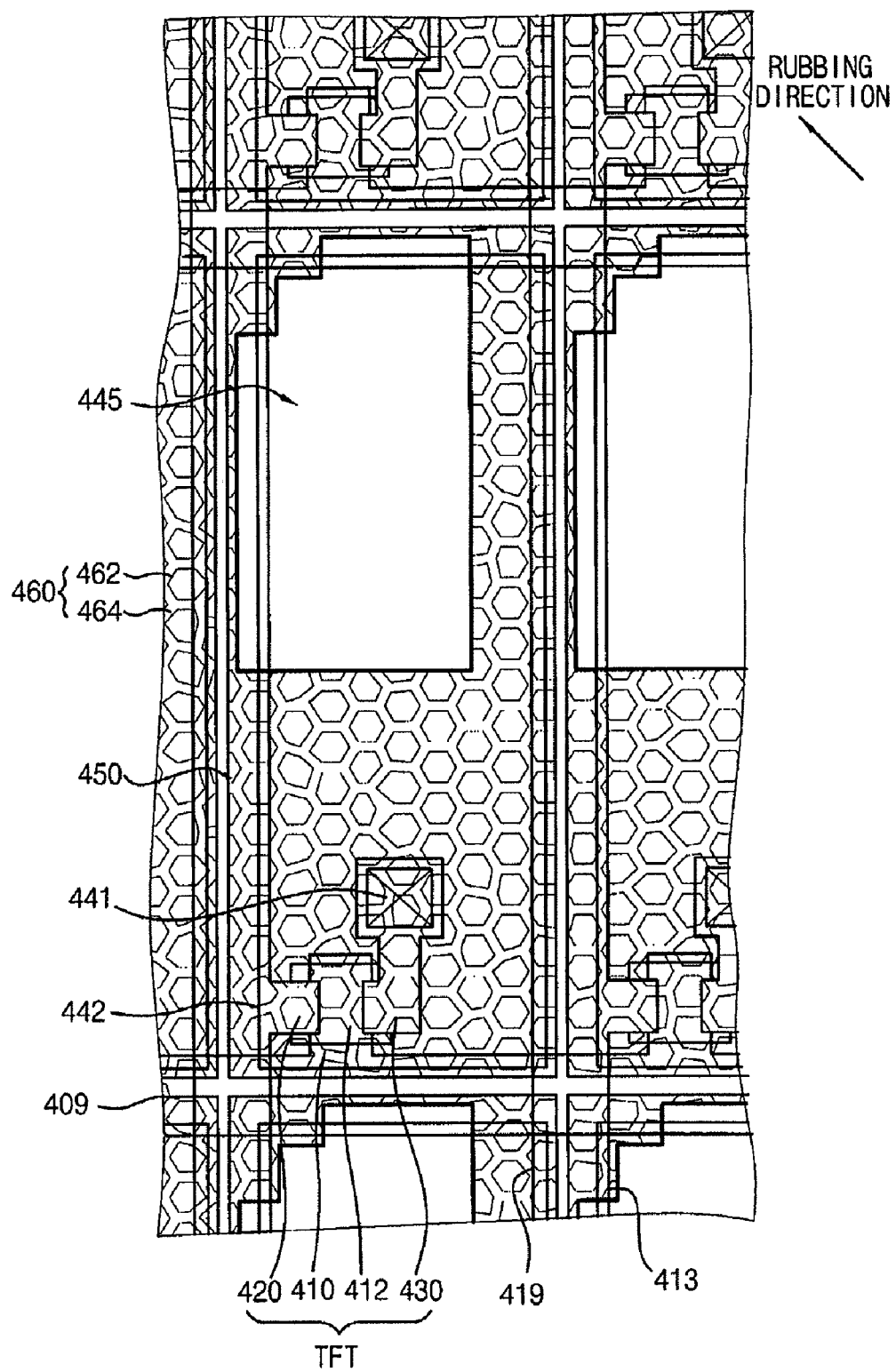

Referring to FIG. 10E, a reflective layer 460 is formed in the pixel region defined by neighboring gate lines 409 and neighboring source lines 419. The reflective layer 460 is embossed also to form a recession 462 and a groove 464, because the reflective layer 460 is formed on the organic insulation layer having embossing patterns. The reflective layer 460 is formed in a reflective region, and a portion of the reflective layer 460, which is adjacent to the transmissive window, may extend toward the transmissive window.

Figure 11:
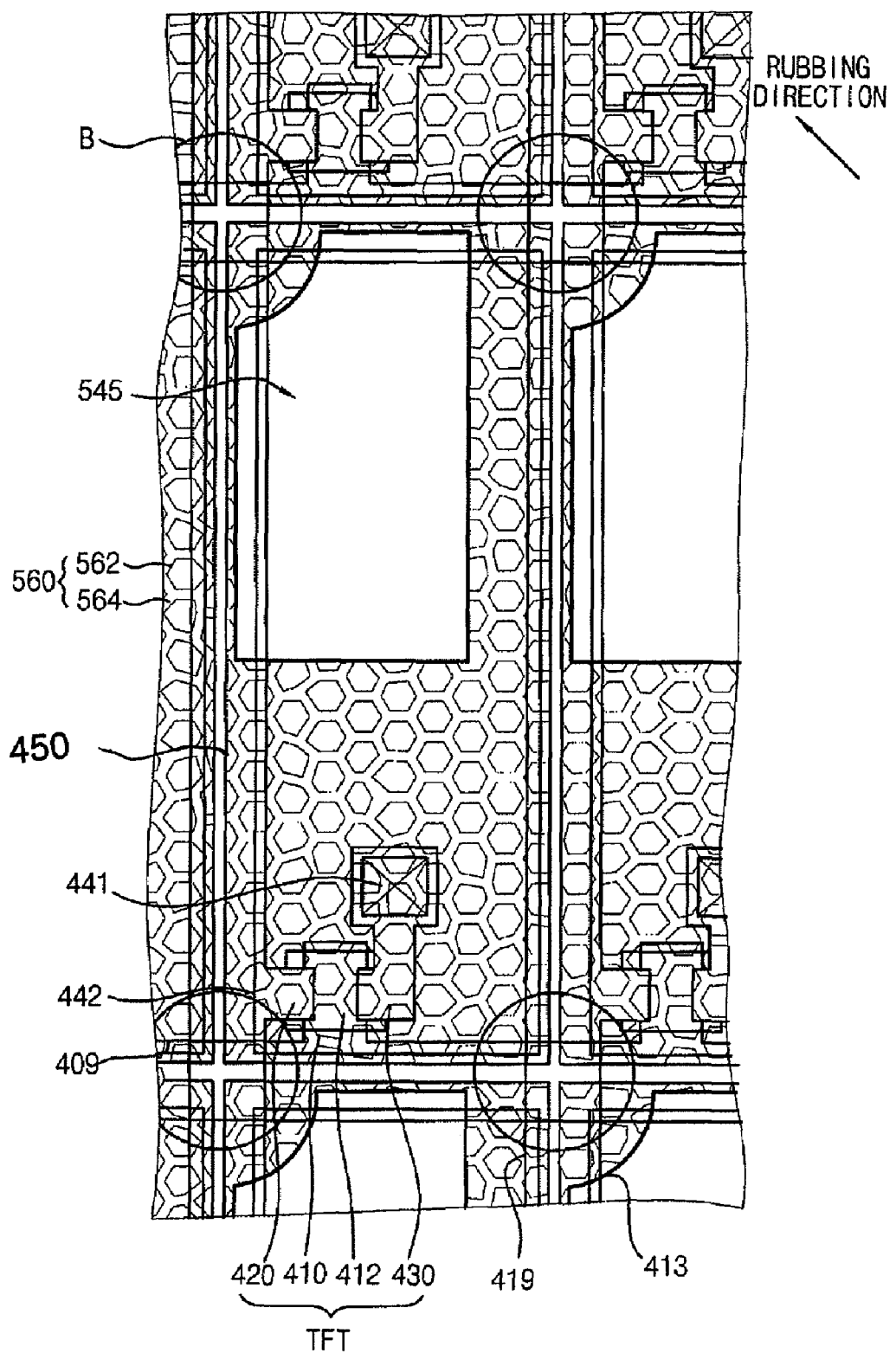
FIG. 11 is a plan view showing a multiple cell gap transmissive and reflective type liquid crystal display according to another exemplary embodiment of the present invention.

FIG. 11 is a plan view showing a multiple cell gap transmissive and reflective type liquid crystal display according to another exemplary embodiment of the present invention. Especially, the multiple cell gap transmissive and reflective type liquid crystal display corresponds to a top ITO structure. The liquid crystal display of the present embodiment is same as above embodiment except for a shape of a transmissive window. Thus, the same reference numerals will be used to refer to the same or similar parts as described in above embodiment and any further explanation will be omitted.

Referring to FIG. 11, a TFT array substrate according to another exemplary embodiment of the present invention includes gate lines 409, source lines 419, a switching device TFT, a transparent electrode 450 and a reflective layer 560 having a reflective region and a transmissive window 545.

The transmissive window 545 has an edge rounded inwardly. That is, the reflective layer 560 protrudes inward to secure a space B for a spacer. Therefore, the spacer does not overlap the transmissive window 545.

The reflective layer 560 is formed in a reflective region, extended toward the transmissive window 545, and electrically connected to a transparent electrode 450. In FIG. 11, when the rubbing direction is corresponds to ten o'clock direction, an edge of upper left side of the transmissive window 445 is recessed toward the transmissive window 445.

Hereinbefore, although a TFT array substrate is explained only, a liquid crystal display employing the TFT array substrate is self-evident. Therefore, an explanation of the liquid crystal display employing the TFT array substrate will be omitted.

According to the present invention, a portion of a transmissive window overlaps with an opaque pattern. Therefore, an afterimage caused by a light leakage is improved. Further, a spacer is supported securely, so that a cell gap is controlled easily.

Having described the exemplary embodiments of the present invention and its advantages, it is noted that various changes, substitutions and alterations can be made herein without departing from the spirit and scope of the invention as defined by appended claims.

What is claimed is:

1. A thin film transistor array substrate, comprising:
   a transparent substrate including a pixel area that has a transmissive window, the transmissive window having a recession on one corner of the transmissive window;
   a thin film transistor formed in the pixel area;
   a transparent electrode being electrically connected to the thin film transistor; and
   a reflective layer formed in a part of the pixel area to define the transmissive window.

2. The thin film transistor array susbstrate of claim 1, wherein sides of the transmissive window are substantially parallel with sides of the pixel area.

3. The thin film transistor array substrate of claim 1, wherein the recession has a curved shape or a linear shape.

4. The thin film transistor array substrate of claim 3, wherein the recession has a round shape, a triangular shape or a stepwise shape.

5. The thin film transistor array substrate of claim 1, wherein the transparent electrode overlaps the reflective layer and the transmissive window.

6. The thin film transistor array substrate of claim 1, further comprising an organic insulation layer formed in the reflective layer.

7. The thin film transistor array substrate of claim 1, wherein the corner is shaped to avoid overlapping a spacer for maintaining a cell gap.

8. The thin film transistor array substrate of claim 1, wherein at least one side of the transmissive window is overlapped with an opaque pattern that is on the transparent substrate.

9. The thin film transistor of claim 8, wherein the opaque pattern includes a gate line, a data line, a light shielding pattern or a storage electrode.

10. A method for manufacturing a thin film transistor array substrate, comprising:
 forming a gate line and a gate electrode on a glass substrate;
 forming a gate insulation layer on the gate line and on the gate electrode;
 forming a semiconductor pattern electrically coupled to the gate electrode;
 forming a data line, a source electrode and a drain electrode on the semiconductor pattern;
 forming a passivation layer on the semiconductor pattern; and
 forming a transmissive pattern by removing a portion of the passivation layer, one corner of the transmissive pattern having a recession.

11. The method of claim 10, wherein sides of the transmissive pattern may be substantially parallel with the gate and data lines.

12. The method of claim 10, further comprising:
 forming an embossing shape on the passivation layer; and
 forming a reflection layer on the passivation layer.

13. The method of claim 10, wherein the recession has a round shape, a triangular shape, or a stepwise shape.

14. The method of claim 10, further comprising:
 forming a transparent electrode on the passivation layer;
 forming an alignment layer on the transparent electrode; and
 rubbing the alignment layer with a cloth;
 wherein the at least one side of the transmissive pattern is recessed, and the rubbing is outgoing on the recessed side of the transmissive pattern.

15. The method of claim 10, wherein the corner is shaped to avoid overlapping a spacer for maintaining a cell gap.

16. The method of claim 10, wherein at least one side of the transmissive pattern is overlapped with an opaque pattern that is on the glass substrate.

17. The method of claim 16, wherein the opaque pattern includes the gate line, the data line, a light shielding pattern or a storage electrode.

18. A liquid crystal display, comprising:
 an upper substrate;
 a lower substrate comprising, a pixel area defined by a pair of adjacent gate lines and a pair of adjacent data lines, a thin film transistor formed in the pixel area, a transparent electrode electrically coupled to the thin film transistor, the pixel area having a transmissive window and a reflective area defining the transmissive window, the transmissive window having a recession on one corner of the transmissive window; and
 a liquid crystal layer injected between the upper substrate and the lower substrate.

19. The liquid crystal display of claim 18, wherein a thickness of the liquid crystal (LC) layer in the reflective area and a thickness of the liquid crystal layer in the transmissive window area are different from each other.

20. The liquid crystal display of claim 18, wherein the portion of the transmissive window overlapped with the opaque pattern is an outgoing edge of the transmissive window with respect to a rubbing direction.

21. The liquid crystal display of claim 18, wherein sides of the transmissive window may be substantially parallel with sizes of the pixel area.

22. The liquid crystal display of claim 21, wherein the recession has a round shape, a rectilinear shape or a stepwise shape.

23. The liquid crystal display of claim 18, wherein the corner is shaped to avoid overlapping a spacer for maintaining a cell gap between the upper and lower substrates.

24. The liquid crystal display of claim 18, wherein at least one side of the transmissive window is overlapped with an opaque pattern that is on the lower substrate.

25. The liquid crystal display of claim 24, wherein the opaque pattern includes a gate line, a data line, a light shielding pattern or a storage electrode.

* * * * *